United States Patent [19]

Zemek

[11] Patent Number: 4,840,268

[45] Date of Patent: Jun. 20, 1989

[54] ADJUSTABLE WIDTH CHAIN CONVEYOR

[75] Inventor: Albert W. Zemek, Windsor, N.Y.

[73] Assignee: Universal Instruments Corporation, Binghamton, N.Y.

[21] Appl. No.: 235,159

[22] Filed: Aug. 23, 1988

[51] Int. Cl.$^4$ .......................................... B65G 15/00
[52] U.S. Cl. .................................................. 198/817
[58] Field of Search ............... 198/817, 626, 627, 819

[56] References Cited

U.S. PATENT DOCUMENTS

| 1,795,612 | 3/1931 | Lormor | 198/817 X |
| 2,106,469 | 1/1938 | Seil | 198/627 X |
| 3,282,402 | 11/1966 | Ayres, Jr. | 198/817 X |
| 3,356,205 | 12/1967 | McLeod | 198/817 X |
| 3,912,072 | 10/1975 | Kornylak | 198/817 X |
| 4,556,143 | 12/1985 | Johnson | 198/817 X |
| 4,643,129 | 2/1987 | Sari | 198/817 X |
| 4,672,914 | 6/1987 | Sari | 198/817 X |
| 4,705,159 | 11/1987 | Feliks et al. | 198/817 X |

FOREIGN PATENT DOCUMENTS 0007113  1/1986  Japan ...................................... 198/817

*Primary Examiner*—Robert J. Spar
*Assistant Examiner*—James R. Bidwell
*Attorney, Agent, or Firm*—Fidelman & Wolffe

[57] ABSTRACT

An adjustable width chain conveyor is disclosed. The conveyor includes angled supports having inclined slide portions on which the chain can slide inwardly or outwardly to accommodate variations in the effective width of products or to compensate for misalignment of conveyor components as the conveyor wears, beyond the tolerance permitted by the product support surface area. A cover is provided to prevent the chain from tipping off of the conveyor.

6 Claims, 2 Drawing Sheets

ADJUSTABLE WIDTH CHAIN CONVEYOR

The present invention is directed to a chain conveyor and, more particularly, to a chain conveyor having angled supports along which the chain can slide, so that the width of the conveyor automatically adjusts to compensate for warp, wear or other lack of straightness or alignment beyond the tolerance permitted by the product support surface area.

BACKGROUND OF THE INVENTION

Conventional chain conveyors, which support the products or articles to be conveyed on the pins of the chains, provide very little freedom of lateral movement of the product on the pins, due to the relatively small support or guide area of the pins and/or the product. A particular difficulty arises when transporting products such as printed circuit boards, because the boards are oftentimes warped, worn or otherwise not square. Occasionally, the board will be warped to such an extent that a corner of the board will "curl up" and not be supported at all by the conveyor, thus decreasing the effective width of the product and the resultant support surface area.

Furthermore, the width of the support area of the printed circuit boards, due to the placement of components close to the edges of the board, can be as little as approximately 0.090 inches or less. Therefore, even minor variations in the effective width of the board will affect the ability of the chain to support it. If the width between the guides changes, beyond the tolerance permitted by the support surface area of the product and/or pins, the product will not be accurately conveyed.

When conveying sturdier products that are less likely to warp or wear and which do not have support surfaces of such critical dimensions, the width of the pin alone determines the effective support surface area. In this instance, a difficulty still arises if the conveyor itself warps or wears.

SUMMARY OF THE INVENTION

The self-adjusting chain conveyor of the present invention utilizes angled supports having inclined support surfaces to support the chain. The supports are arranged so as to form a "no-load" guide path narrower than the width of the product. This forces the chain up the incline. However, the weight of the chain travelling on the inclined support surface causes the chain to slide downwardly on the support until held by a stop or the product itself. In this way, the width between the chains of the conveyor of the present invention adjusts to compensate for warp, wear or other lack of straightness or alignment beyond the tolerance permitted by the product support surface area.

DETAILED DESCRIPTION OF THE PREFERRED EMBODIMENTS

Figure 1:
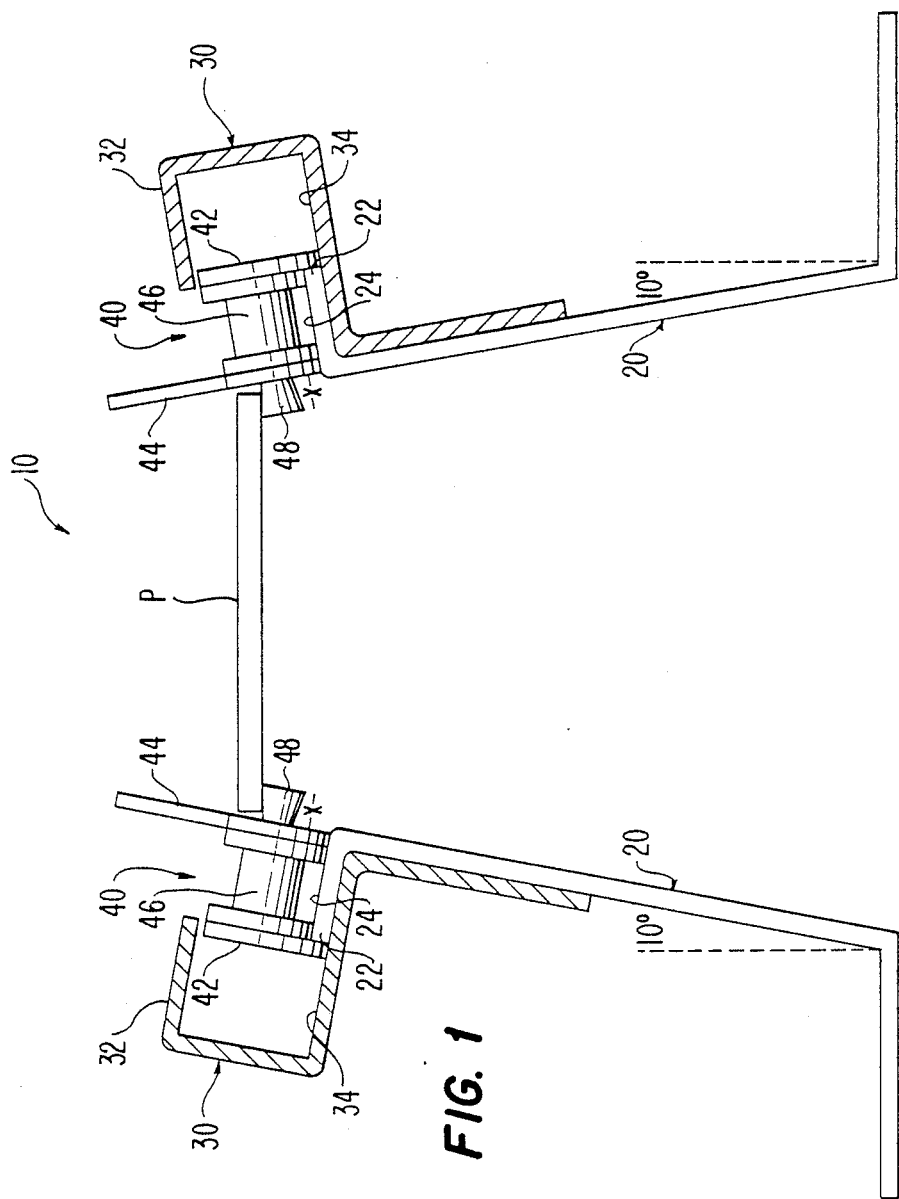
FIG. 1 is a cross-sectional end view of the chain conveyor in accordance with a preferred embodiment of the present invention.

A preferred embodiment of the adjustable chain conveyor in accordance with the present invention is illustrated in FIG. 1 and generally designated 10. Conveyor 10 includes angled supports 20, spaced a desired distance apart and attached to a frame (not shown) in a conventional manner. These supports are of a length substantially the same as the conveyor run.

Support 20 has a stop portion 22 and an inclined slide portion 24, as will be discussed in greater detail below. In a preferred embodiment, the support is angled inwardly 10 degrees from the vertical, although the angle can vary according to the type of product to be conveyed, the materials used and the like. In fact, the support could even be vertical (with no inward lean), as long as the inclined slide port 24 is angled to support the chain in the slidable manner to be discussed in more detail below.

Guide rail 30 is attached to the outer side of each support 20. The guide rail preferably has a cover portion 32 to prevent the chain from tipping off of the support. The guide rail also has an inclined slide portion 34, adjacent inclined slide portion 24 of support 20. The chain rides on these two inclined slide portions in a manner to be discussed below.

Chain 40 includes extended outer plates 42 which act as stops and inner plates 44 which are of sufficient length to insure contact with warped product, surrounding link 46. Such chains are readily commercially available and any suitable pin and side plate configurations can be used, taking support restrictions and prevention of product warpage into consideration. Chain 40 further includes a number of extended link pins 48, the number being determined according to the intended application of the conveyor. As shown in the figures, pins 48 may include frusto-conical ends to support the products. The product or article to be conveyed P is supported on the pins so that it is carried between the chains. The support surface area of the product; i.e. that portion of the product which is available for supporting, can be no less than the length of the pins X.

Figure 2:
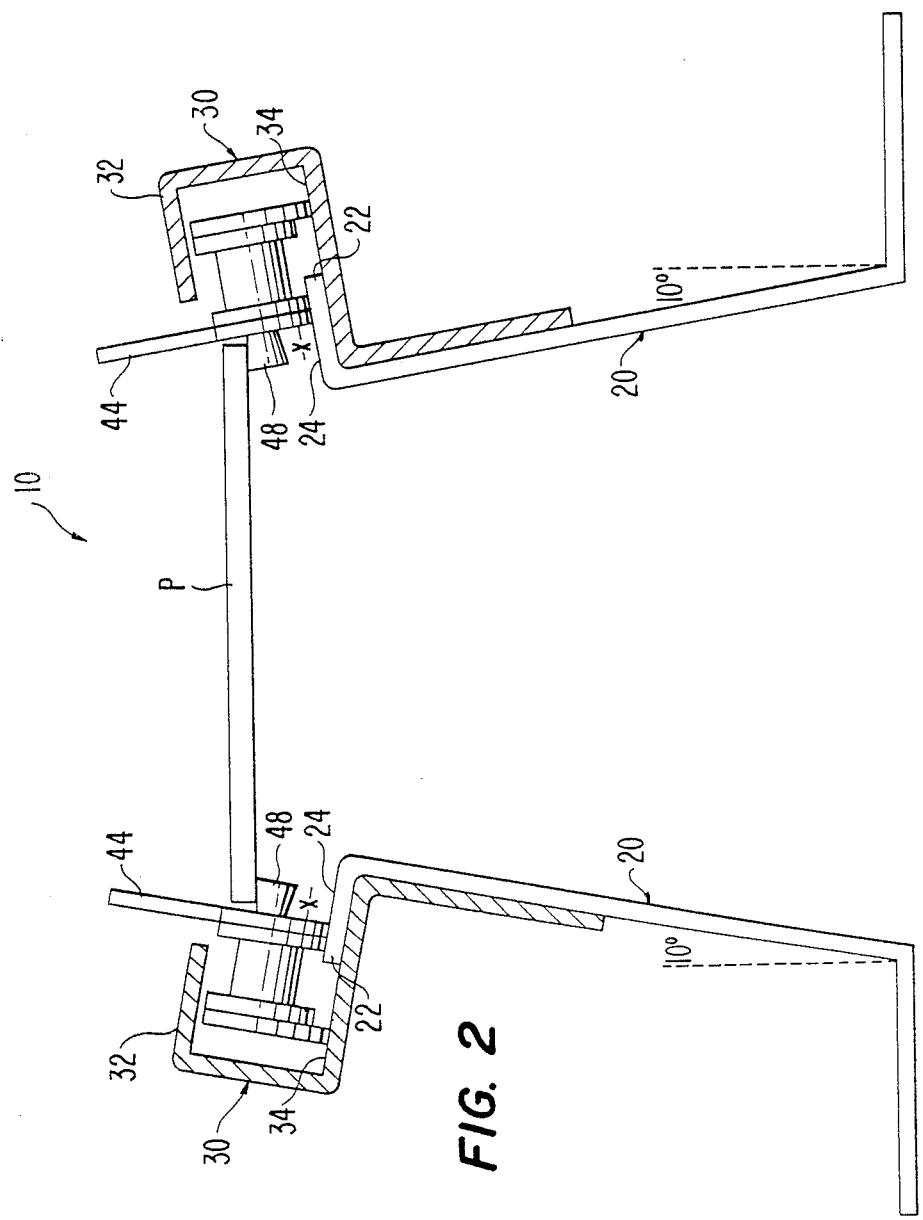
FIG. 2 is a further cross-sectional end view of the chain conveyor of FIG. 1 showing the chain moved outwardly on the supports.

Chain 40 is supported by support 20 and guide rail 30 as shown in FIG. 1 and is freely slidable along inclined slide portiosn 24, 34 (compare FIGS. 1 and 2, for example). The supports are preferably spaced apart by a distance less than the width of the product, so that the chain is forced up the inclined slide portion 24 and inclined portion 34 when the chain is loaded.

Once the product is loaded onto the conveyor, the weight causes the chain to slide downwardly on the inclined slide portions until stopped by the product. If the product is narrow enough, the sliding of the chain will be stopped by side plate 42 contacting stop portion 22 instead (as in FIG. 1). If the effective width of the product varies from one another, the chain will slide inwardly or outwardly to accommodate the product as they travel down the conveyor. If the conveyor wears over a period of time so that the support and/or guide rails become misaligned or if the guides warp or wear, the sliding of the chain on the inclined slide portions will compensate for any misalignment beyond the tolerance permitted by the product support surface area.

Preferably, the chain used in the present invention is an endless chain and any suitable chain return can be used. Likewise, sliding movement of the chain lengthwise along the conveyor can be facilitated via a suitable motor (not shown).

The chain conveyor of this preferred embodiment can be used, for example, to transport printed circuit boards. In situations where heat or corrosion is a concern, such as in an oven, the conveyor is preferably formed of stainless steel, although it is contemplated that other materials may be used.

The foregoing is for illustrative purposes only. Modification can be made, particularly with regard to size, shape and arrangement of parts, within the scope of the invention as defined by the appended claims.

I claim:

1. A self-adjusting chain conveyor device for accommodating conveyed items of varying effective widths and compensating for misalignment of the conveyor beyond the tolerances permitted by the item support surface area, said device comprising:

a chain having spaced chain portions for supporting the items;

support means for slidably supporting said chain portions thereon, said means including a pair of supports inclined toward each other and spaced a predetermined distance apart;

means for limiting the downward slide of said chain portions on each of said support means; and means for preventing said chain portions from tipping off of each of said support means.

2. A chain conveyor device as in claim 1, wherein the conveyed items are printed circuit boards.

3. A chain conveyor device as in claim 1, wherein said support means includes a substantially L-shaped stand portion and an inclined slide portion.

4. A chain conveyor device as in claim 3, wherein the angle between the legs of said stand portion is approximately 10 degrees.

5. A chain conveyor device as in claim 3, wherein said means for preventing said chain from tipping includes a cover portion and a guide portion coupled to each of said support means, said guide portion having an inclined slide portion contiguous to said inclined slide portion of said support means.

6. A chain conveyor device as in claim 1, wherein said predetermined distance is less than the width of an average item.

* * * * *

UNITED STATES PATENT AND TRADEMARK OFFICE
CERTIFICATE OF CORRECTION

PATENT NO. : 4,840,268

DATED : June 20, 1989

INVENTOR(S) : Albert W. ZEMEK

It is certified that error appears in the above-identified patent and that said Letters Patent is hereby corrected as shown below:

In Column 4, claim 4, line 3, change "10" to --100--.

Signed and Sealed this

Twenty-seventh Day of March, 1990

Attest:

JEFFREY M. SAMUELS

*Attesting Officer*    *Acting Commissioner of Patents and Trademarks*